(12) United States Patent
Newkirk et al.

(10) Patent No.: US 7,989,011 B2
(45) Date of Patent: Aug. 2, 2011

(54) FILTRATION OF VEGETABLE SLURRIES

(75) Inventors: Rex W. Newkirk, Winnipeg (CA); David D. Maenz, Saskatoon (CA); Henry L. Classen, Saskatoon (CA)

(73) Assignee: MCN Bioproducts Inc., Saskatoon, Saskatchewan (CA)

( * ) Notice: Subject to any disclaimer, the term of this patent is extended or adjusted under 35 U.S.C. 154(b) by 1155 days.

(21) Appl. No.: 10/535,160

(22) PCT Filed: Nov. 24, 2003

(86) PCT No.: PCT/CA03/01812
§ 371 (c)(1),
(2), (4) Date: Aug. 24, 2006

(87) PCT Pub. No.: WO2004/047548
PCT Pub. Date: Jun. 10, 2004

(65) Prior Publication Data
US 2006/0273047 A1    Dec. 7, 2006

(30) Foreign Application Priority Data
Nov. 22, 2002  (CA) ..................................... 2412613

(51) Int. Cl.
*C02F 1/00* (2006.01)

(52) U.S. Cl. ........ 426/489; 426/629; 426/455; 426/459; 426/463; 426/469; 426/578; 426/634; 426/656; 100/112; 100/110; 100/117; 100/126; 100/145

(58) Field of Classification Search .................. 426/629, 426/455, 459, 463, 469, 578, 634, 656, 489; 100/112, 110, 117, 126, 145
See application file for complete search history.

(56) References Cited

U.S. PATENT DOCUMENTS

| | | | |
|---|---|---|---|
| 4,018,899 A | 4/1977 | Seckler et al. | |
| 4,350,624 A | 9/1982 | Herubel | |
| 4,481,118 A * | 11/1984 | Heissenberger et al. | ..... 210/783 |
| 4,921,615 A | 5/1990 | Lindoerfer et al. | |
| 4,975,183 A | 12/1990 | Glorer | |

(Continued)

FOREIGN PATENT DOCUMENTS
EP           933122           8/1999

(Continued)

OTHER PUBLICATIONS

Vincent Horizontal Press. http://web.archive.org/web/20020617230836/http://www.vincentcorp.com/brochure/other.html. Published Jun. 2002.*

(Continued)

*Primary Examiner* — Anthony Weier
(74) *Attorney, Agent, or Firm* — Daphne L. Maravei; Blake, Cassels & Graydon LLP

(57) ABSTRACT

Shown is a two stage filtration system for treatment of fibrous vegetable matter, particularly oilseed materials such as oil-extracted canola flakes to separate the low valued fibrous material from soluble material and small non-structural water-insoluble material of higher value. The filtration system receives a vegetable matter slurry and passes the slurry through first stage filter which is an impeller type filter that operates to separate the slurry into a filtrate and a moist retentate. The moist retentate is further filter in a second compression filtration stage or a centrifuge to remove additional water. Small non-structural insoluble matter is removed in the filtrate.

18 Claims, 3 Drawing Sheets

U.S. PATENT DOCUMENTS

| | | | |
|---|---|---|---|
| 5,814,230 A | 9/1998 | Willis et al. | |
| 6,588,331 B2 * | 7/2003 | Thibodeau | 100/112 |
| 6,800,308 B2 * | 10/2004 | Maenz et al. | 426/44 |
| 7,090,887 B2 * | 8/2006 | Newkirk et al. | 426/629 |
| 2004/0149649 A1 * | 8/2004 | Uchiyama | 210/600 |

FOREIGN PATENT DOCUMENTS

| WO | WO 01/87083 | 11/2001 |
|---|---|---|
| WO | WO 2004/047548 | 6/2004 |

OTHER PUBLICATIONS

Tzeng, Y-M et al: "Production of Canola Protein Materials by alkaline Extraction, Precipitation, and membrane Processing" Journal of Food Sience, Institute of Food Technologists, Chicago, U.S. vol. 55, No. 4, 1990, pp. 1147-1151, 1156, XP002230721, ISSN:0022-1147 paragraphs "Introduction" and "Materials and Methods".

* cited by examiner

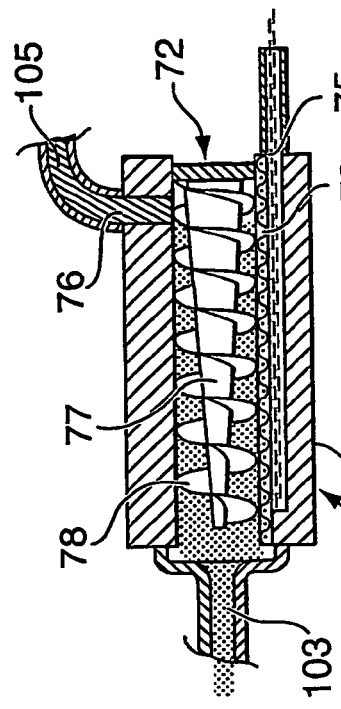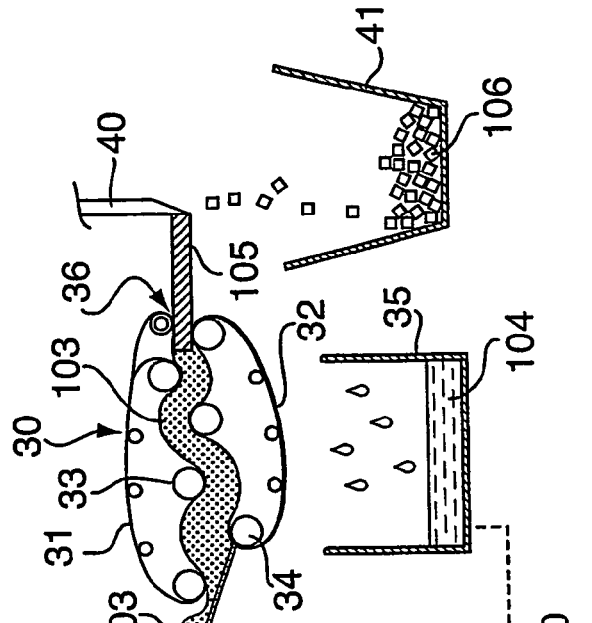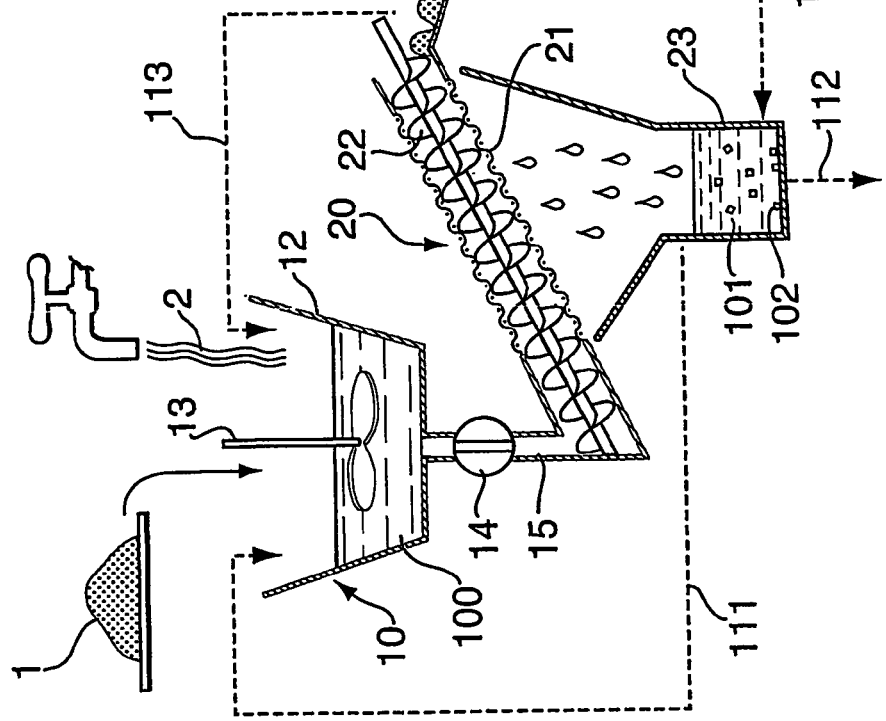
FIG. 1a
FIG. 1

FILTRATION OF VEGETABLE SLURRIES

FIELD OF THE INVENTION

The present invention relates to the extraction of carbohydrates and/or proteins from crushed or processed vegetable matter. It is particularly useful for the recovery of protein and carbohydrate values from oilseeds from which the oil has been extracted.

BACKGROUND OF THE INVENTION

Vegetable materials often consist of high valued materials such as protein and valued non-structural carbohydrates in combination with low valued fibrous structures such as hulls and straw. Some, but not all, of the valuable proteins and carbohydrates are water soluble. Many of the non-water-soluble valued proteins and non-structural carbohydrates are present as particles smaller than the fiber.

One particular group of products which contain useful amounts of carbohydrate and protein are oilseed materials from which oil has been extracted. In cases where they have been de-fatted by a cold press process to remove oil, they also contain a considerable amount of residual oil. Less oil is present when they are de-fatted by a solvent process. In particular, the product remaining after oil has been removed from canola (rapeseed), which is called defatted canola flake, is a rich source of valued proteins and carbohydrates. These oilseed materials also contain low valued fibrous materials such as hulls and straw, which should be removed to give a higher-value product.

One way to separate the low valued fibrous material from water soluble valuable material is by aqueous extraction. In aqueous extraction processes, water is added to the vegetable starting material to form a thick slurry. Typically, the slurry is composed of three distinct phases: a liquid containing the soluble components of the starting material, a light solids phase composed of fine particles in suspension; and a heavy solids phase composed of fibrous materials such as hulls and residual straw. Extraction processes are frequently designed to remove only the liquid phase from the slurry. Such processes utilize established separation techniques such as centrifugation that are designed to generate a clear liquid extract. However, the fine particles in suspension, which contain valued proteins and carbohydrates, are directed toward the solid residue in any separation system that generates a clear extract. Chemical modification is frequently employed to improve the solubility of proteins in the slurry. However, these modifications add cost to the process and can damage the nutritional value of the extract.

It would be advantageous to develop a mechanical separation system that directs the fines toward the extract and in so doing generates an extract consisting of both the liquid phase and the light solids phase containing the valued fines. This would permit recovery of both soluble and non-soluble (small particulate) non-fibrous non-structural material in the extract. The non-soluble, small particulate material is frequently high in valuable materials such as carbohydrates and proteins.

However, when many crushed vegetable products are slurried, the liquid portion of the slurry is thick and viscous. This is because of various water-soluble or partly soluble proteins and carbohydrates which pass into the water phase of the slurry. In defatted oilseeds, some residual oil may also be present. Also, after the defatting process (particularly in the case of making defatted canola flake), some small particles of cell meat may be present. These are high in protein, and are therefore especially valuable to recover.

In the case of a thick viscous starting slurry of vegetable material, such as a slurry of oil-extracted canola flakes, obtaining efficient extraction of liquid plus light phase solids has certain difficulties. Compression-based filtration can be used to obtain an extract containing light phase solids. In this process the slurry is pressed with a filter media having pore openings or aperture sizes that permit passage of the light solid phase in the slurry, while retaining the heavy solids as an extracted presscake. An example of this type of process is shown in PCT Published Application 03/043438 of MCN BioProducts Inc. However, the thick viscous nature of the slurry results in compacting of the filter media, poor separation per unit area of filter media and considerable extrusion of slurry from the sides of the filter media. Therefore, direct processing of a viscous slurry of vegetable material by compression filtration as described in the PCT published application requires extensive filtration area and slow process rates. Substantial equipment is required, which drives up the cost of production.

Willis et al U.S. Pat. No. 5,814,230 describes a process and apparatus for the separation of coarse and ultrafine solids from a liquid stream. In this process multiple filter screens of various pore opening sizes are passed repeatedly through the solids containing feed suspension until a filter cake builds up on the surface of the screens and a clarified solids-free liquid phase is generated. The solids are subsequently discharged from the screen and dewatered by means such as vibration and direct blasts of air or by compression-based dewatering. The multiple screens of progressively smaller pore openings are designed to generate a solids-free clarified extract and thus in the case of extraction of a vegetable slurry the valued fragments of cell meats would not reside in the extract generated by this process.

Glorer U.S. Pat. No. 4,975,183 teaches that a stirring apparatus can be automatically raised and lowered during pressure driven filtration of a solids-containing slurry to create an even distribution of cake on the filtering surface and thus improved performance of the filtration process. This process can be described as an improvement of conventional single stage pressure-driven filtration.

Lindoerfer et. al U.S. Pat. No. 4,921,615 teach a multi-stage pressure-driven method for solids removal from viscous liquids. In this process, the viscous feed slurry containing solids is pressure filtered in a series of steps involving filter material of progressively decreasing pore size. This process is designed to generate a clear liquid extract.

Impeller-driven filtration is a known filtration technique. In such filtration, a rotating impeller blade is passed close to a filter medium, as a slurry is passed over the same filter medium. The action of the impeller repeatedly sweeps the slurry over the filter medium, and minimizes compacting of the slurry on the filter media. However, impeller-driven filtration tends to leave a residue which remains high in water content.

Centrifugation is a known filtration technique. However, centrifugation is not effective with viscous vegetable slurries, because the viscous nature of the slurry does not permit adequate separation using established centrifugal filtration processes.

Thus, current separation apparatus and processes do not provide a practical and cost-effective means for separating water-soluble proteins and small particles of cell meats (when present) from the remaining vegetable matter, particularly when a viscous slurry is involved. Additionally, they tend to leave the residue fairly wet, so that a considerable amount of energy is required for drying.

BRIEF DESCRIPTION OF THE INVENTION

The current invention describes a two-stage high capacity filtration system suitable for separation of a viscous slurry of starting material. The invention functions to separate a viscous aqueous extract containing water soluble components plus valued small particles of cell meats (if present) efficiently from the remaining vegetable material. The final residue generated by the inventive process can be dried subsequently without great expenditure of energy. The invention has particular utility in separating useful carbohydrates and proteins from defatted oilseed, particularly defatted canola flake.

In the filtration system of the invention, there is a first stage with impeller-driven filtration, followed by a further stage with filtration by compression filter means or a centrifuge.

DESCRIPTION OF THE DRAWINGS

The invention will be disclosed in conjunction with the following drawings in which:

FIG. 1 shows a first embodiment of filtration apparatus according to the invention;

FIG. 1a shows a sectioned partial view of a modification of the embodiment of FIG. 1 using a screw press.

DETAILED DESCRIPTION OF THE INVENTION

Figure 2:
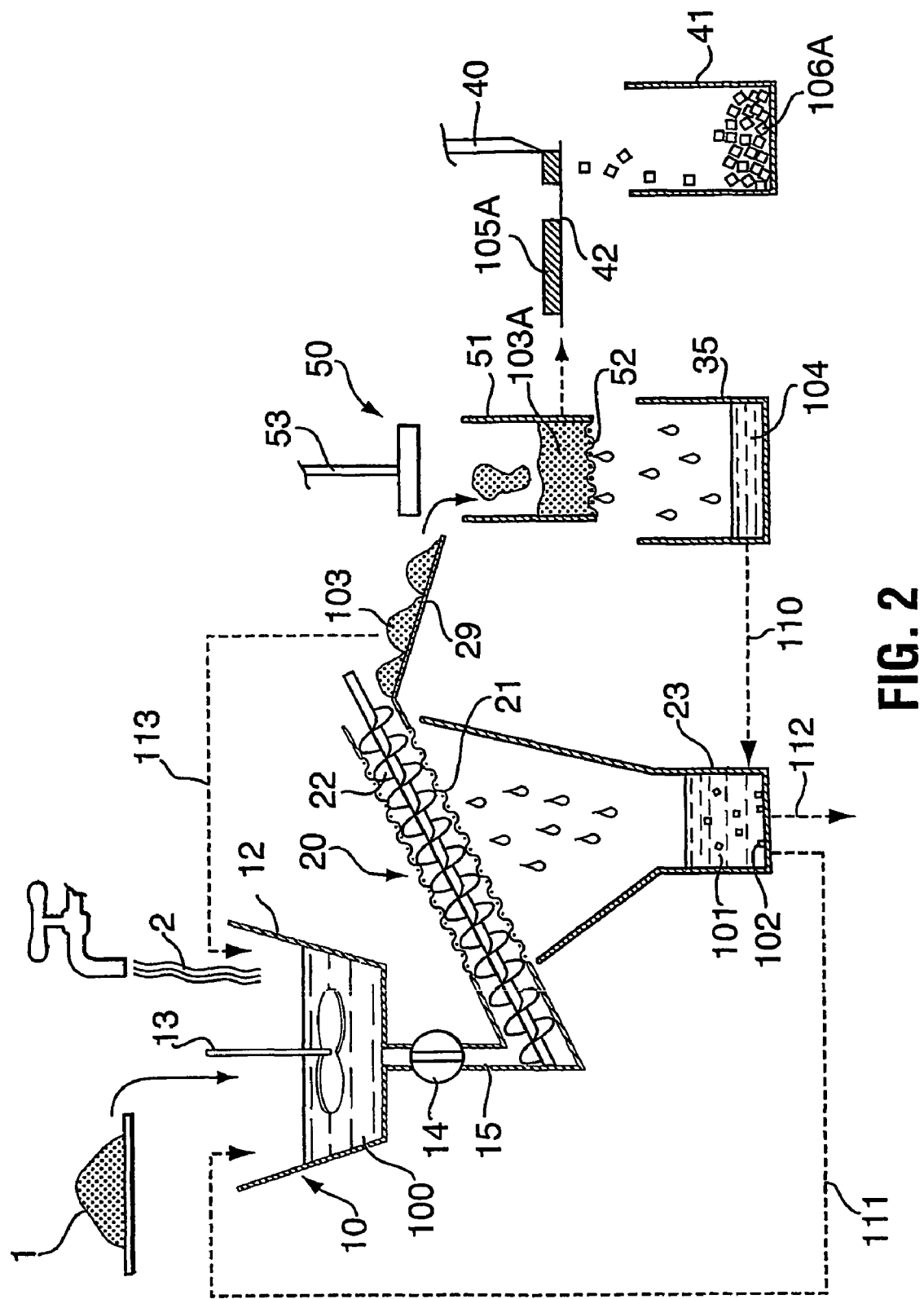
FIG. 2 shows a second embodiment of filtration apparatus according to the invention; and, FIG. 3 shows a third embodiment of filtration apparatus according to the invention.

In the present invention, a first stage filtration is carried out using impeller-driven filtration. The aperture size (also known as "pore opening") of the filter medium can be set to allow the passage of fine solids in suspension through the apertures while retaining solids of larger dimensions than the maximum aperture size of the filter on the filter medium as a residue. The sweeping action of the impeller can then be used to scrape the residue from the surface of the filter medium and remove it from the area where filtration is being carried out.

The aperture size, when filtering slurries of defatted oilseed, particularly defatted canola, is preferably chosen so that it will permit the passage of fine particles of cell meat, while retaining the larger solids, which are less-desirable vegetable matter.

The residue obtained from the impeller filtration still contains a high percentage of moisture. Such residue cannot conveniently be dried, as the cost of drying would be prohibitive. Therefore, a second filtration stage is used. The second stage filtration can be either centrifugal or filtration by compression.

Centrifugal filtration is not preferred, because the residue tends to be of large bulk. This means that a large centrifuge is required, which increases the equipment cost of the operation. Also, the moisture content of the solids phase residue remaining after centrifugation is generally higher than that obtained by compression filtration. However, centrifugal filtering is possible for use as the second stage, because the viscous liquid in the original slurry has been made considerably less viscous by its passage through the impeller filter.

Compression filtration progressively reduces the volume available to the material to be filtered to effect filtering. Compression filtration may be of several types.

In one type, a piston can be used to compress the residue material to be filtered against a filter medium, thereby squeezing out the remaining liquid.

Another type of compression filtration involves continuous processes whereby moisture-laden feed in continuously fed to the input area of the equipment, the feed is then conveyed through the press under pressure that squeezes moisture through a filtering surface, and the dewatered cake discharged from the output area. Two examples of continuous compression filtration systems are the use of a belt press or a screw press. A belt press or screw press compression filter has the advantage that it is a continuous process, whereas piston compression is a batch type process.

The liquid which is extracted from the residue by the compression filter or centrifuge can, if desired, be combined with the liquid from the impeller-filtration stage. Alternately, to reduce overall water use, it can be used as the water input for the impeller filter, and the final liquid product can be removed as the filtrate from the impeller-filtration stage. Further, if desired, the minimum apertures of the filter medium in the piston compression press or the belt chosen for the belt press can be of a size to permit the passage of small fragments of cell meat which may have been entrained in the residue, and which may fall out with the liquid being extruded.

The minimum aperture of the filter media can be chosen depending on the largest dimension of the solid particles that are desired to pass through the filter. The selection preferably is made having regard to typical sizes of cell meat particles or other valuable small particles which are present. In the case of defatted canola, there are typically cell meat particles which have a largest dimension of up to about 75 microns. Therefore, it is most preferred to have filters with at least a 100 micron minimum aperture and preferably a 150 micron minimum aperture, to permit the cell meats to pass into the extract. The maximum aperture is not very critical, provided that it is small enough so that the fibrous materials present do not pass through. Typically, filters having maximum apertures of up to 2500 microns can be used, as typically most of the fibrous materials such as hulls and straw (which are desired to be retained in the retentate after filtration) do not pass through filters of this size. However, where there are smaller pieces of hulls and straw, the maximum aperture can be reduced accordingly, particularly as very few cell meats are over 75 microns in their largest diameter. Therefore, a filter with a maximum aperture of 190 microns or 250 microns is often preferred.

By "maximum aperture" and "minimum aperture" of the filter are meant the average maximum or minimum dimension (as the case may be) of the apertures of the filter. If the apertures are substantially round and of uniform size, then the maximum aperture and minimum aperture are the same, and both are the diameter of the aperture (this is sometimes called the "pore size"). If they are approximately square in cross section, then the "maximum aperture" is the diagonal across the square and the minimum aperture is the length of a side. Generally, it is preferred to have apertures which are round, square, or of a rectangular shape with sides and ends that are not very different in length, rather than having apertures with one dimension (for example a length) much greater than another dimension (for example the width). Thus, desirably, the maximum and minimum apertures are not very different from one another. The apertures should also be of approximately the same cross section through the entire thickness of the filter medium, to prevent particles getting trapped in the filter medium. Most filter media for impeller filtration or belt filtration are wire or cloth meshes, with uniform square or approximately square apertures between alternate parallel wires or threads of the mesh. In the case of a belt press, the thickness of the belts and the weave pattern of the material also affect what can pass through the belt, and need to be considered as well as aperture size if it is desired to have small particles (such as cell meats) pass through the belt.

Several embodiments of the invention will be described with respect to the drawings.

FIG. 1 illustrates a preferred embodiment of the invention. In FIG. 1, there is a slurry formation stage indicated generally at 10. Defatted oilseed 1 (or another vegetable product containing soluble proteins and/or carbohydrate and small particles of insoluble proteins and/or carbohydrate in a solid which is largely fibre) and water 2 are placed into vessel 12. In vessel 12, they are mixed and agitated by means of an impeller 13 to form a slurry 100. Slurry 100 is removed from the vessel 12 periodically. This can be done in any convenient way, but is done in the present illustrated embodiment by means of exit pipe 15. Exit pipe 15 can be provided with suitable valving means 14 to close it until the defatted oilseed 1 and water 2 have been blended to make a slurry 100 of the desired consistency.

Slurry 100, which is removed through pipe 15, is passed into an impeller-driven filter generally indicated as 20. The impeller-driven filter has a filter medium 21, which is preferably a mesh formed into a tube. The mesh surrounds an impeller 22, which is an auger which fits closely against mesh 21 forming the tube. The slurry 100 passes through the mesh tube 21, and the auger. As it moves the slurry forwardly and upwardly, the auger 22, through the close fit contact of the auger 22 with the mesh filter medium 21, sweeps the slurry across the filter medium 21. Suitably, the mesh is of sufficiently large mesh size (minimum aperture) so that the small pieces of cell meat which are in the slurry pass out through the mesh and fall, with the liquid, into container 23. Container 23, therefore contains liquid 101, which has been filtered from the slurry, and cell meat particles 102, which also passed through the mesh 22. Liquid 101 and cell meat particles 102 together are high in protein, and can be further processed to make a high value human or animal food or food supplement.

Emerging from the top of the auger 22 is a moist residue 103, which is the residue that remains after liquid 101 and cell meats cell meat 102 have been filtered from slurry 100. Residue 103 is passed into a compression filter in the form of a belt press 30. Belt press 30 is shown schematically as having endless belt 31, which rolls over rollers 33 and endless belt 32, which rolls over rollers 34. The belts are oriented so that they pass over the rollers in a serpentine path with compression on the material between the belts increasing as the mixture passes through from left to right in FIG. 1. As the belts approach one another, liquid is squeezed from the residue 103 and falls as liquid 104 into container 35. At the exit 36, the residue 103 has been largely dewatered and extrudes from the exit 36 as a substantially solid presscake 105. This presscake is cut or crumbled by knife 40, and falls as product 106 into bin 41. Product 106 is suited for use as a feed for ruminant animals.

FIG. 1a shows a sectioned view through an alternate form of compression filter suitable for use with the system of FIG. 1. The residue 103 is passed into a compression filter in the form of a screw press 70. Screw press 70 is shown with a cross-section taken through housing 71 to depict the manner of operation of this form of screw press. An archimedian screw 72 rotates within housing 71 to urge incoming residue 103 from left to right in the drawing along the passage formed by housing 71. The archimedian screw 72 has increasing diameter of its shank 77 from left to right in FIG. 1a. The passage defined by the housing 71 and the screw threads 78 therefore decreases in cross-sectional area from left to right. As the screw turns, the decrease in cross sectional area available to material passing through the passage increases pressure on the material and causes liquid to be expelled from the screw press across filter media 73 that is disposed along a length of the interior of the screw press. The liquid is directed along passage 75 from which it can be directed to container 35 of FIG. 1. At the end of the filter the residue 103 has been compressed and extrudes from the filter via passage 76 as a presscake which can be directed into bin 41 of FIG. 1.

FIG. 2 shows a variant of FIG. 1. In FIG. 2, like numerals indicate like portions to FIG. 1. Instead of a belt press 30, the embodiment of FIG. 2 has a pistonpress 50. The piston press 50 has a compression chamber 51, with an end formed from mesh 52. Suitably compression chamber 51 is a cylinder, but it may be of other shapes if desired, provided the piston fits within it to compress the residue. Moist residue 103A is moved (for example by a conveyer belt 29), into compression chamber 51, where it rests against mesh end 52. When the cylinder is sufficiently filled with a discrete portion of the moist residue, the supply of residue 103A is interrupted. This can be done by directing conveyor 29 to a holding vessel (not shown) or by turning off the auger 22, so that no material is put onto conveyor belt 29.

Piston 53 is then caused to descend into compression chamber 51, compressing the residue 103 and squeezing it, to press out liquid 104. This liquid is collected in a vessel 35. The piston 53 is then withdrawn, and the compressed residue is removed as a presscake 105A. This is advanced on a suitable conveyor belt 42 to a knife 40, where it is cut into pieces, which fall into bin 41 to form product 106A. Product 106A from this embodiment is essentially the same as product 106 from the first embodiment discussed above, except that, depending upon the pressure exerted by piston 53 in compression chamber 51, and the length of time that the pressure is exerted, product 106A from this embodiment can be made to be somewhat dryer than the product 106 from the first embodiment. The fact that the product can be dryer is of course an advantage, as less subsequent drying is needed. However, this has to be offset against the fact that the need for filling the compression chamber, then compressing the piston into it requires the process of FIG. 2 to be discontinuous, instead of the continuous process of FIG. 1. Generally, the process of FIG. 1 requires less labour than the process of FIG. 2.

Figure 3:
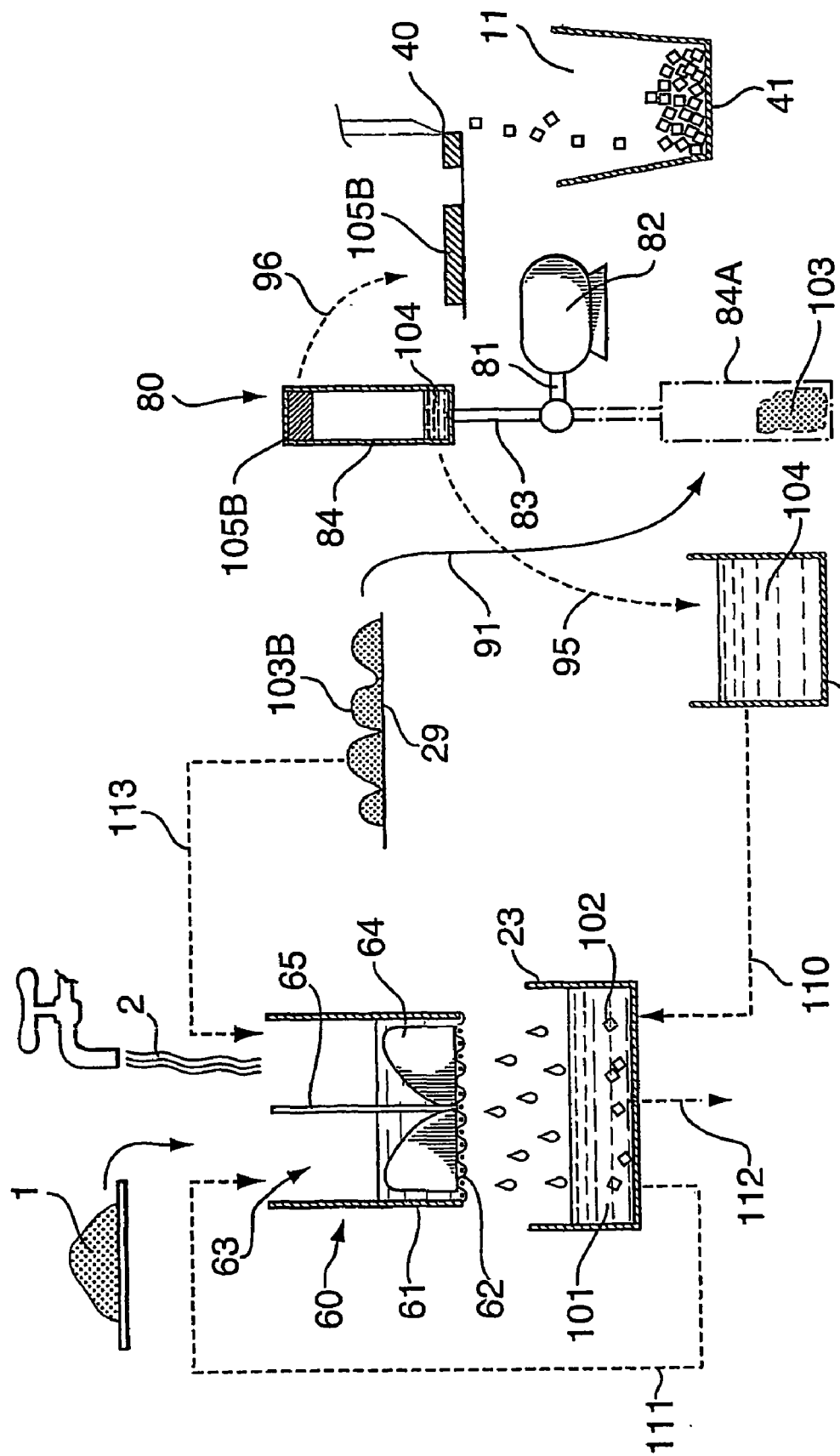

FIG. 3 shows a third embodiment of the invention. The same reference numerals are used in FIG. 3 as in FIGS. 1 and 2, where similar things are illustrated.

The embodiment of FIG. 3 shows a different type of impeller filter from FIG. 1. In FIG. 3, the impeller filter is an open vessel generally illustrated as 60, with walls 61 and a mesh bottom 62. The vessel has in it a paddle-type impeller generally indicated as 63, which has paddle blades 64 rotating about a powered axis 65. As the blades 64 rotate, they push the slurry against the filter mesh 62. This causes the expression of liquid 101, with cell meats 102 in it, into the container 23 below.

From time to time, the supply of defatted canola 1 and water 2 is interrupted. Paddles 64 are allowed to operate until substantially no more liquid passes through the mesh 62. What remains in the vessel 60 is then a residue 103B, not unlike 103 of the first embodiment or 103A of the second embodiment. The impeller 63 is removed, and the contents of the vessel 60 are dumped onto conveyor belt 29 to be passed to the second stage. The contents are a moist residue 103B.

In the embodiment shown in FIG. 3, the second stage filtration is a batch filter centrifuge shown generally as 80. The centrifuge has a central axle 81, driven by a motor 82. The axle supports an arm 83 with a separating vessel (shown in section) on the end. The separating vessel is shown at 84 in one position and at 84A (in dashed lines) in a second position. Hinged access means, (not shown) permits access to the separating vessel. In operation, the separating vessel (originally in the position shown by dashed lines 84) is charged with moist residue 103B, as is shown schematically by arrow 91. The centrifuge is operated to separate liquid from the residue. The centrifuge is then stopped, with the separating vessel, for example in the position 84 delineated by solid lines. The moist residue 103B has separated into a solid 105B (which is generally similar to solid presscake 105) and liquid 104. Liquid 104 and solid 105B are removed from the centrifuge as shown by arrows 95 and 96 respectively. Solid 105B can be cut with knife 40 to make pieces 106B, similar to pieces of product 106 or 106A in the previous embodiments.

A continuous centrifuge can be used instead of the batch centrifuge shown.

In each of the embodiments described, liquid 104 is high in protein. It can be used directly as a food or animal feed or mixed with liquid 101 (and entrained cell meats 102) for direct use as a food or animal feed. Alternately, to reduce the water needs of the process, liquid 104 can be used as the liquid feed to the first stage instead of water 2, or mixed with some water 2 for makeup. This is shown by dashed arrows 110 and 111 respectively. If recycling of the liquid 104 in this way is used, liquid product can be drawn off from container 23, either continuously or discontinuously, as shown at 112.

In many cases, it is desirable to repeat one or more of the filtration stages, to increase recovery of protein in the liquid product. Thus, it is sometimes desirable to re-slurry the product 106, 106A or 106B in water, and to re-do the first and second stage filtration. Thus, the process is repeated a second time (or more than two times) with the product 106, 106A or 106B being used instead of oilseed 1 as an input for the first stage. This extracts further soluble proteins and more small particles of cell meats, so that more of the protein and carbohydrate value of the defatted oilseed or other vegetable product is recovered in the liquid products 101 and 104.

It is also desirable in some cases to recycle moist residue 103, 103A or 103B to vessel 61, to repeat the first stage filtering one or more additional times, before sending on the moist residue by conveyor belt 29 to the second stage. This is shown diagrammatically by dashed line 113. The second stage filtering apparatus (a compression filter or a centrifuge) is more expensive than the first stage filtering apparatus. Repetition of the first stage can therefore in some cases permit more protein product to be extracted into vessel 23, therefore requiring fewer passes through the second stage equipment while still maintaining good extraction efficiency.

The ratios of water to defatted oilseed or other vegetable material used in this process can vary considerably. High moisture ratios (ratios with more water) generally provide improved extraction efficiencies: however, equipment costs are higher due to the size of the equipment required to handle to larger amount of water and liquid streams. Low moisture ratios result in overly thick slurries that are difficult to convey and provide less efficient extraction of valued proteins. Generally it is preferred to use a water/oilseed ratio of about 2.5:1 to 20:1 (wt/wt) with canola flake. It is also preferred to heat the water (for example to 50-75 degrees C.) to aid dissolution of the proteins and carbohydrates in it. However, the ratio of water to vegetable product and the water temperature depend largely on the process economics at the specific installation, and are not intended to limit the process disclosed.

The impeller filter 60 of FIG. 3 can be used in the embodiments of either FIG. 1 or 2 in lieu of impeller filter 20 of those figures. The centrifuge 80 (or a continuous centrifuge) can be used in the embodiments of FIG. 1 or 2 instead of the compression filters of those embodiments. The important thing is that there be an impeller stage filtration to remove the bulk of the viscous liquid, followed by a second stage compression or centrifugal filtration process for moisture reduction.

The invention will now be further described by way of comparative examples.

Example 1 Comparative Example

Use of Belt Press Only

In this example, canola flakes were mixed with water and filtered using only compression filtering (with the arrangement shown at 30 in FIG. 1. The product (106) is then resuspended in a lesser amount of water, and again filtered through the belt press.

Fifteen kg of oil-extracted desolventized canola flakes were slurried with 90 kg of water at 60° C. (6 parts water: 1 part starting flake) and mixed to an even consistency over a 10 minute period. A very viscous slurry resulted. The slurry was fed to 7 roller belt filter press (Model EJ-25-9, Frontier Technologies, Allegan, Mich., USA) equipped with 2×12 inch belts (350 cubic feet/min air passage opening). (This apparatus is shown schematically in FIG. 1 at 30) The slurry was compressed between the belts such that an extract containing small fragments of cell meats was separated from the extracted residue material. Pressure on the belts was maintained at a constant 80 PSI. Processing rates were adjusted to maximum based on the amount of slurry that could be fed into the press without extrusion of slurry from the sides of the belt while maintaining an acceptable final dry matter of the presscake of >30%. Belt processing rates were calculated as the amount of dry white flake in the slurry processed per meter of belt width per minute. The weights and the dry matter content of the extract and the first presscake were determined.

The cake from the first passage was then reslurried with ~60 kg of water at 60° C. such that the total amount of water used in the 2 passes equalled 10 parts water: 1 part dry canola flake. The second slurry was less viscous than the first, but still noticeably viscous. It was processed through the belt filter press as previously described. Process rates and measurements of the extract and the cake were as described for the first passage.

Extract (liquids 102 and 104) from the 2 passes were combined and the total weight, dry matter content and extraction efficiency was determined. Suspended solids were determined as % of the total volume of extract as packed solids in the bottom of centrifuge tube after centrifugation at 5,000 rpm for 5 min.

Example 2

Example Using the Process of the Invention

In this example, the apparatus shown schematically in FIG. 1 (an impeller type filter as shown schematically at 2 followed by a belt press as shown schematically at 30) was used.

Fifteen kg of oil-extracted desolventized canola flakes were slurried with 90 kg of water at 60° C. (6 parts water:1 part starting flake) and mixed to an even consistency over a 10 minute period. The slurry (which was very viscous) was feed to a impeller driven auger-type filter equipped with a 6 inch diameter conical filter screen with 118 micron sized openings (model FF-6, Vincent Corporation, Tampa, Fla., USA). The impeller propelled the slurry over the inner surface of the screen resulting in separation to generate a thick extract containing small fragments of cell meats and an extracted cake. The weights and dry matter contents of the extract and the filter cake were determined.

The filter cake from the impeller filtration step was relatively wet and thus poorly suited for drying. However, a substantial portion of the viscous liquid was removed during the first filtration step. The cake was then processed directly through the belt filter press as described in the comparative example above. Process rates, weights and dry matter contents of the extract and cake were determined as described.

The cake discharged from the belt filter press was reslurried with 60 kg of water at 60° C. such that the total amount of water used in the 2 passes equalled 10 parts water: 1 part dry canola flake. The second slurry was processed through the impeller filter and the cake then processed through belt filter press as described for the first passage. Process rates and measurements of the extracts and the cakes were as described for the first passage. The table shows belt press processing rates, weights and dry matter contents of extracts and cakes, extraction efficiencies and losses of dry matter for the comparative example—(Example 1) and the example according to the invention (Example 2).

In the table, the following abbreviations are used:
BP—belt press. BP-1 denotes the first pass through the belt press in the example, and BP-2 denotes the second pass through the belt press.
IF—impeller filter. IF-1 denotes the first pass through the impeller filter in Example 2 and IF-2 denotes the second pass though the impeller filter in Example 2. The impeller filter was not used in Example 1.
Extract—the combined liquids shown as 102 and 104 in FIG. 1, with any cell meat 102 contained in it.
dm—dry matter
ss—suspended solids.

Both the impeller filter and the belt filter press allowed passage of considerable amounts of valued cell meat material in the form of small particles of suspended solids. Very little contamination of the extract by hull material was apparent in the extract.

In Example 1 both high moisture slurries readily extruded from the sides of the belt resulting in very slow processing rates. In Example 2 initial processing of the slurry with the impeller filter removed 69.2 kg of extract and generated a 21.8 kg cake that was readily processed by passage through the belt press. The belt press processing rate was 7.4 fold greater than obtained without removal of the bulk of the liquid with the impeller filter. Final dry matter of the presscake was 37.0%. Similar results were obtained in processing the resuspended cake from the first passage. Prior removal of the bulk of the viscous liquid with the impeller filter thus resulted in a 15 fold increase in belt press processing rates, as well as a slightly better extraction efficiency. Approximately 75% of the protein in the canola flake was recovered in the extract.

While the invention has shown and described in particular embodiments, it will be understood that other embodiments will be evident to a person skilled in the art. Therefore, it is intended that the invention not be limited by the particular embodiments, but should rather be given the full extent set out in the appended claims.

The invention claimed is:

1. A process for separating protein and/or carbohydrate components from insoluble fiber-containing components of a vegetable product which comprises the steps of:
   (a) mixing said vegetable product with water to form a slurry;
   (b) filtering the slurry by impeller filtration to form a predominately liquid filtrate and a moist solid residue wherein said step of impeller filtration comprises continuous filtration of the slurry by a rotating paddle impeller that both propels and pulses the incoming slurry against the inside of a tubular filter screen; and
   (c) removing water from the solid residue by a compression filtration means.

2. The process of claim 1 wherein said step of impeller filtration comprises continuous filtration of the slurry by auger driven passage through a tubular filter.

3. The process claim 1 wherein the step of compression filtration comprises continuous filtration by passing the solid residue between opposed filter belts which gradually and progressively compress the solid residue as the solid residue passes between them.

4. The process of claim 1 wherein the step of compression filtration comprises continuous filtration by passing the solid residue through a screw press.

5. The process of claim 1 wherein the step of compression filtration comprises filtration of discrete portions of the solid residue in compression filtration means comprising a compression chamber which has a filter media bounding a portion of the chamber by placing the solid residue in the chamber and compressing the solid residue against said portion.

6. A process as claimed in claim 1 in which the predominantly liquid filtrate also contains small particles of solid high in protein and/or carbohydrate.

7. A process as claimed in claim 1 in which the vegetable product is a defatted oilseed meal.

8. A process as claimed in claim 1, in which the vegetable product is oil-extracted canola flake from a solvent-based oil-extraction process.

9. A process as claimed in claim 8, in which the predominantly liquid filtrate contains particles of cell meat.

10. Separation apparatus for treating a solid product with water soluble components, which comprises in combination:
    (a) means for mixing the product with water to form a slurry;
    (b) an impeller type filter to separate the slurry into a filtrate and a moist retentate, wherein said impeller type filter comprises a rotating paddle impeller and tubular filter media housing, the rotating and vibrating paddle impeller closely fitting to the filter media, and wherein said impeller propels and pulses the slurry against an inside surface of the filter media; and
    (c) compression filter means to remove further water from the moist retentate.

11. The apparatus of claim 10 wherein said impeller type filter comprises a tubular filter media housing an auger impeller closely fitting to the filter media.

12. The apparatus of claim 10 in which the impeller type filter media comprises a mesh with apertures which permit passage of fine particles comprising at least one of protein and carbohydrate.

| Pass | Belt Press Process Rate (kg dm/m/min) | Extract (kg) | Extract % dm | Extract % ss | Cake (kg) | Cake % dm | Extraction Efficiency (%) |
|---|---|---|---|---|---|---|---|
| Ex. 1 BP-1 | 0.42 | 75.9 | 7.4 | | 21.8 | 33.4 | |
| BP-2 | 0.14 | 59.5 | 3.9 | | 10.9 | 37.0 | 55.1 |
| Ex. 2 IF-1 | | 69.2 | 8.8 | 30.0 | 40.8 | 21.5 | |
| BP-1 | 3.09 | 14.7 | 6.9 | 16.7 | 17.9 | 38.5 | |
| IF-2 | | 53.3 | 2.1 | 13.3 | 21.3 | 22.5 | |
| BP-2 | 2.13 | 7.2 | 3.6 | 10.0 | 13.0 | 31.2 | 58.1 |

13. The apparatus of claim 10, wherein said impeller type filter has a filter media which is a mesh having a minimum aperture of about 75 microns.

14. The apparatus of claim 10, wherein said impeller type filter has a filter media which is a mesh having a maximum aperture of about 2500 microns.

15. The apparatus of claim 10, wherein said impeller type filter has a filter media which is a mesh having a maximum aperture of about 250 microns.

16. The apparatus of any of claim 10, wherein said compression filter means comprises at least one pair of filter belts which are oriented so as to convey the solid residue while gradually and progressively compressing the solid residue in the direction of movement of the solid residue between the pair of filter belts.

17. The apparatus of claim 10 wherein the compression filter means comprises a screw press.

18. The apparatus of claim 10 wherein said compression filter means comprises a compression chamber, a portion of which is bounded by filter media and a piston adapted to be received within the compression chamber to compress solid residue within the compression chamber against the filter media.

* * * * *